March 31, 1942.  P. M. COLE  2,277,683
ARTICLE HANDLING APPARATUS
Filed Jan. 7, 1941  9 Sheets-Sheet 3

INVENTOR
P.M. COLE
BY
E.P. Nowlan
ATTORNEY

March 31, 1942.  P. M. COLE  2,277,683

ARTICLE HANDLING APPARATUS

Filed Jan. 7, 1941   9 Sheets-Sheet 4

INVENTOR
P. M. COLE
BY
E. R. Nowlan
ATTORNEY

March 31, 1942.   P. M. COLE   2,277,683
ARTICLE HANDLING APPARATUS
Filed Jan. 7, 1941   9 Sheets-Sheet 6

INVENTOR
P. M. COLE
BY
E. R. Nowlan
ATTORNEY

March 31, 1942. P. M. COLE 2,277,683
ARTICLE HANDLING APPARATUS
Filed Jan. 7, 1941 9 Sheets-Sheet 7

INVENTOR
P. M. COLE
BY
E.R. Nowlan
ATTORNEY

March 31, 1942.  P. M. COLE  2,277,683
ARTICLE HANDLING APPARATUS
Filed Jan. 7, 1941  9 Sheets-Sheet 8

INVENTOR
P. M. COLE
BY
E. R. Nowlan
ATTORNEY

March 31, 1942. P. M. COLE 2,277,683
ARTICLE HANDLING APPARATUS
Filed Jan. 7, 1941 9 Sheets-Sheet 9

INVENTOR
P.M. COLE
BY
E.R. Nowlan
ATTORNEY

Patented Mar. 31, 1942

2,277,683

UNITED STATES PATENT OFFICE 2,277,683

ARTICLE HANDLING APPARATUS

Paul M. Cole, Meadville, Pa., assignor to Western Electric Company, Incorporated, New York, N. Y., a corporation of New York Application January 7, 1941, Serial No. 373,465

4 Claims. (Cl. 302—2)

This invention relates to articles handling apparatus, and more particularly to apparatus for orienting, magazining and securing parts in place on other members, especially adapted to handle and secure small parts of irregular form.

There are innumerable instances in industry where a blank of more or less irregular form, for example the sheet metal punching for a terminal, hereinafter described, is to be placed in a specific relation to and position on a member, such as the cord hereinafter described, to which it is then to be secured by clamping or other suitable means. In many such cases the blanks present unusual difficulties where they are to be handled by automatic machinery because they are of irregular widths along one dimension so that the center of gravity of such a blank is some distance from its center of length. They are particularly difficult to control in a case such as the one herein illustrated, in which the blank, although generally symmetrical about one longitudinal plane through its center, is unsymmetrical and unbalanced with respect to both of the planes through its center at right angles to each other and to the one plane of symmetry. The blanks in question being supplied to the apparatus from cartons, boxes or the like in which they lie in helter-skelter orientation, present problems of individual orientation, of alignment and control of orderly arrangement in and presentation from a magazine or other supply means, of individual application in proper position for attachment in place, and of maintenance in such position while being secured in place.

An object of the present invention is to provide apparatus for automatically orienting and magazining parts or blanks of the general character described in a reliable and continuously operating manner.

With the above and other objects in view, the present invention may be embodied in a container to receive an unoriented supply of blanks, and means therein to orient and deliver blanks therefrom in an oriented sequence, together with a magazine to receive and house the sequence, the orienting and delivering means comprising a vertically reciprocable pneumatic member to pick up and orient or discard a blank falling on the top thereof and to blow an unoriented blank into the magazine.

Other objects and features of the invention will appear from the following detailed description of one embodiment thereof taken in connection with the accompanying drawings in which the same reference numerals are applied to identical parts in the several figures and in which—

Figure 18:
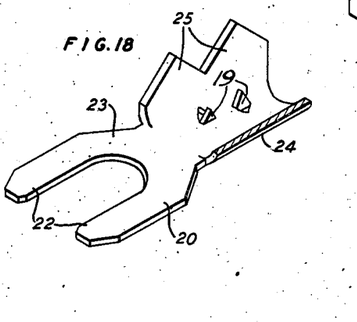
Fig. 18 is a much enlarged view in perspective of a terminal blank before clamping.
Figure 19:
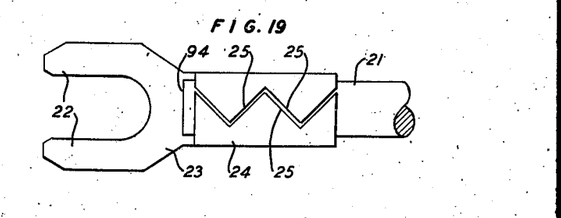
Fig. 19 is a similar view thereof after clamping.

The invention is herein disclosed and illustrated as applied to the doing of a specific and narrowly limited operation, namely to receive a number of blanks, punched and formed of metal to have the shape shown at 20 in Fig. 18, arrange them in pairs, assemble these on an insulated electrical conductor cord 21, and clamp them in place on the cord as shown in Fig. 19. Details of the particular machine selected to be presented here as an illustrative embodiment of the invention are controlled by the specific shapes of the terminal blanks 20 and cord 21. Modifications required to adapt the machine to deal with analogous operations on parts of like nature with the terminal blanks 20 are within the scope of the invention.

The terminal blanks 20, as received, comprise integrally a flat forked contact portion 22, a short flat neck 23 and an unfinished U-shaped sleeve portion 24, whose upstanding sides are serrated at their upper edges forming teeth 25, each tooth on either side being opposite an intertooth space on the other side. When clamped in place on the cord, the teeth 25 of each side are to intercalate with the teeth 25 of the opposite side, as shown in Fig. 19, while other points or prongs 19 on the floor of the sleeve 24 stand up therefrom to cut through the insulating sheath of the cord 21 and make electrical contact with the metallic conducting core of the cord.

Figure 1:
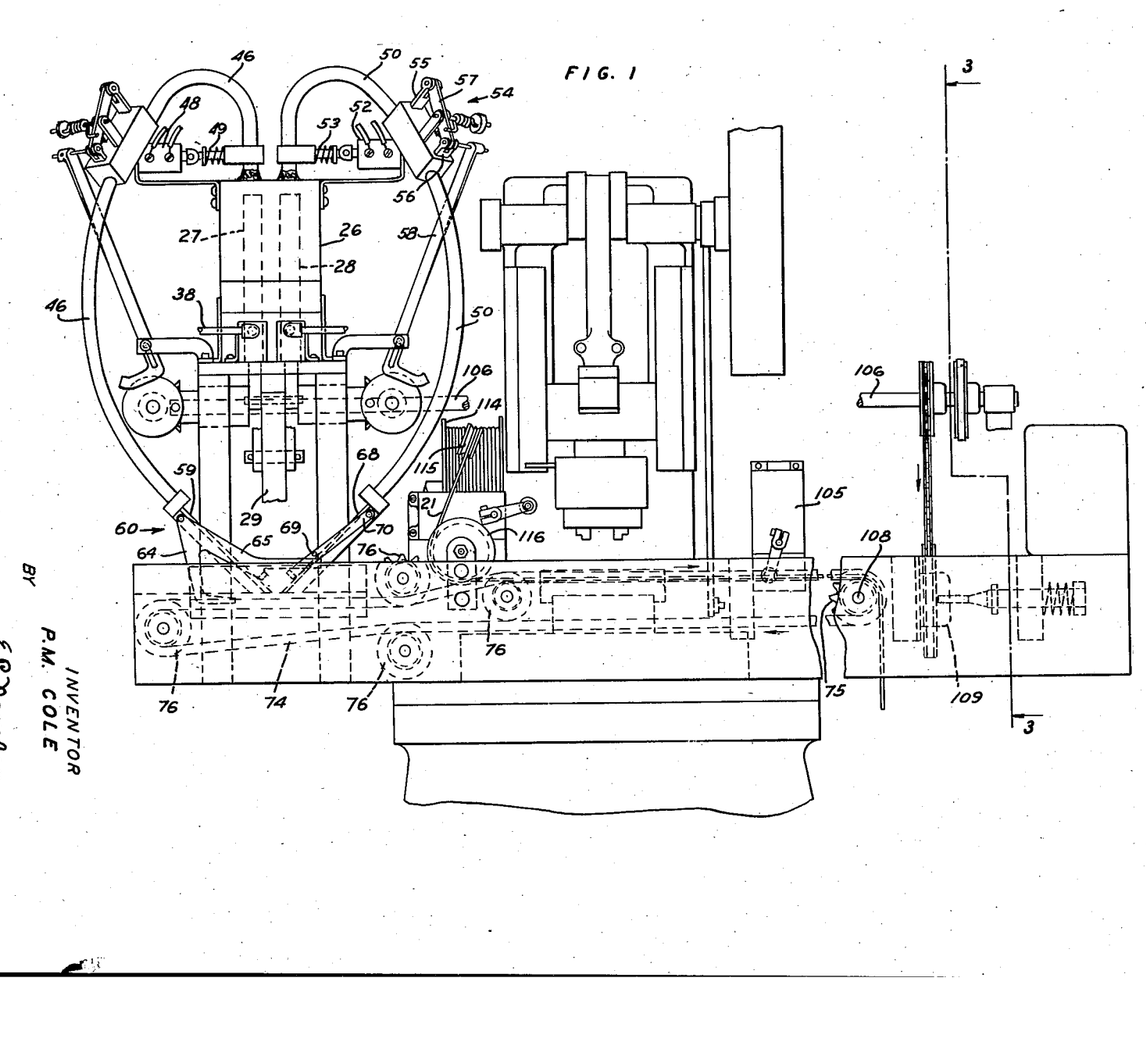
Fig. 1 is a diagrammatic view in front elevation of an apparatus constructed in accordance with the invention.
Figure 2:
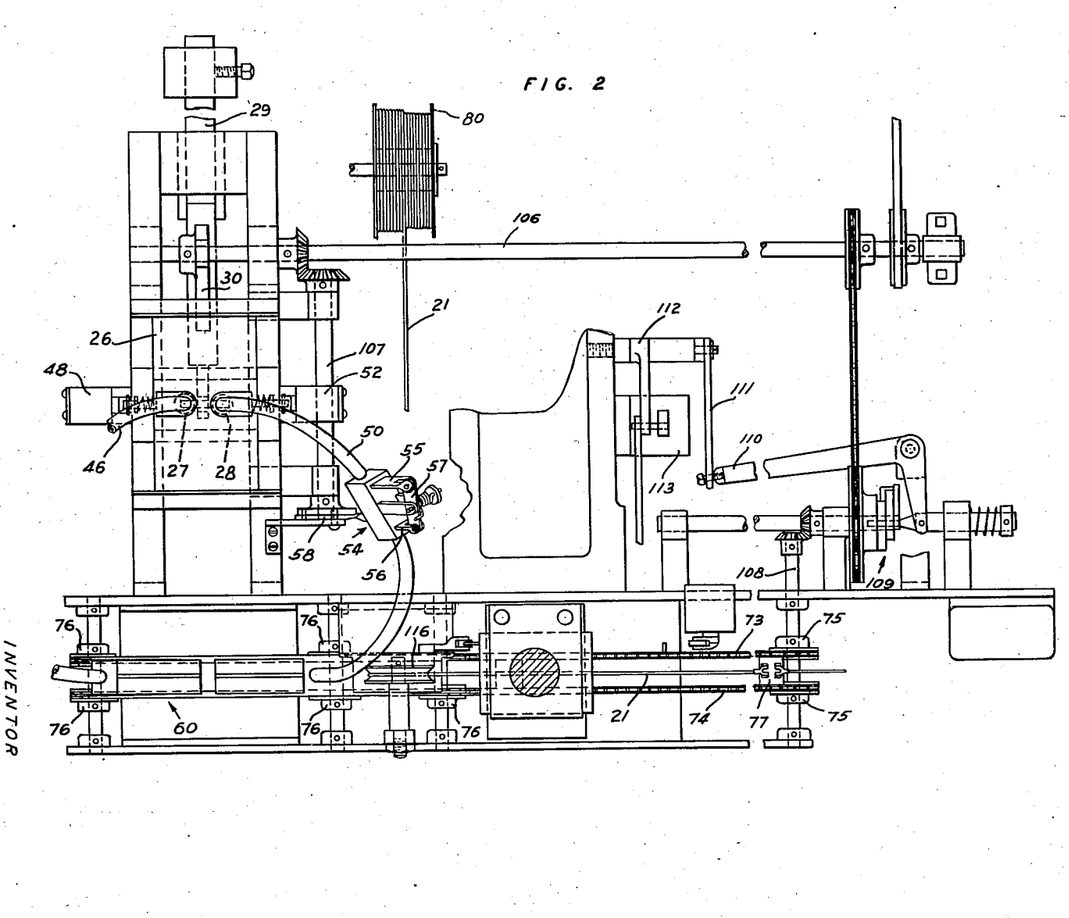
Fig. 2 is a similar plan view thereof.
Figure 3:
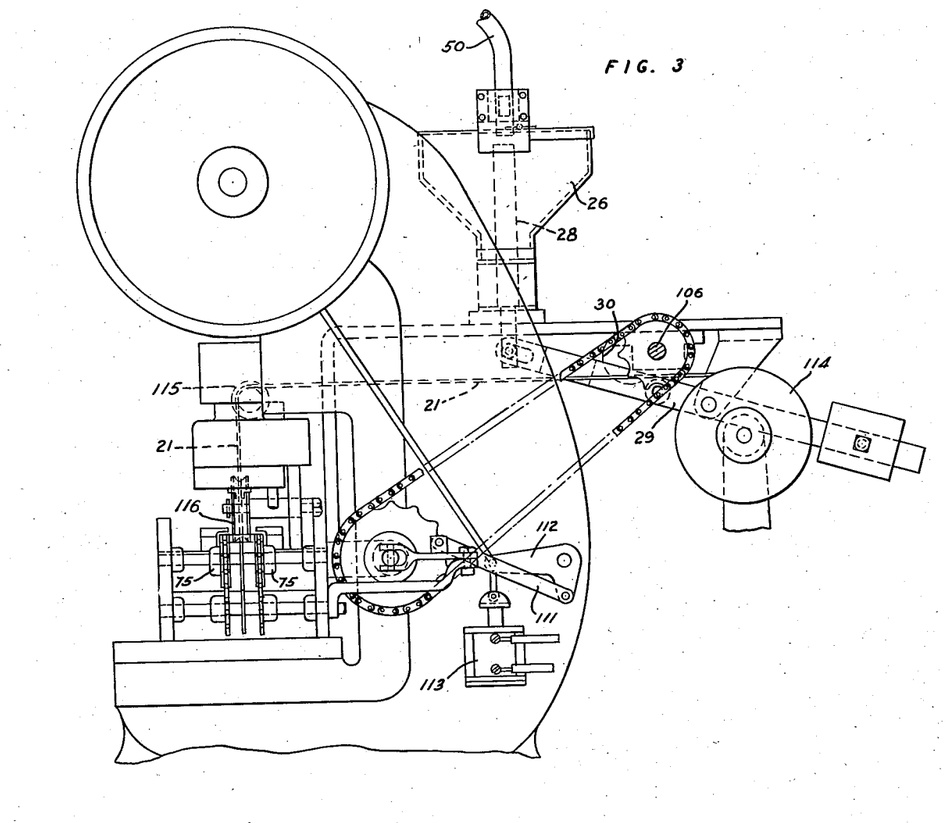
Fig. 3 is a similar end view thereof on the line 3—3 of Fig. 1.
Figures 4, 12, 13, 14:
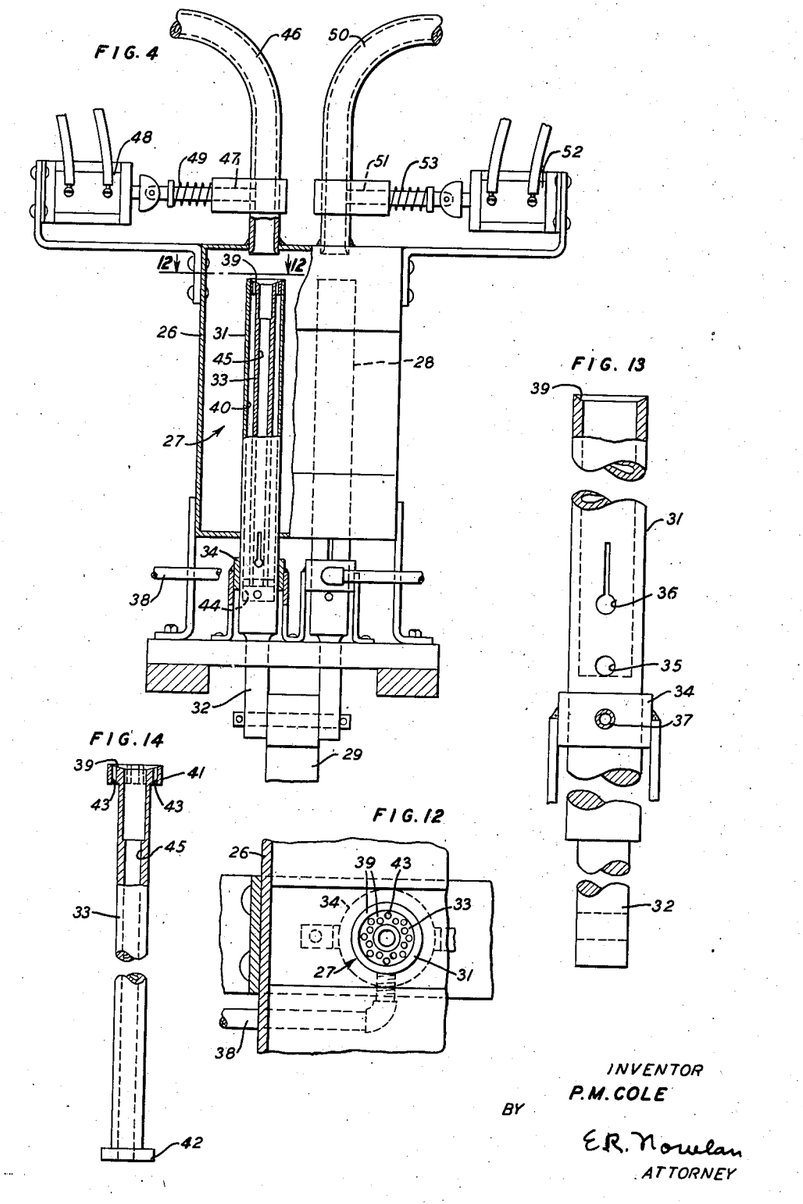
Fig. 4 is an enlarged detached broken view of the hopper.
Fig. 12 is a view on the line 12—12 of Fig. 4.
Fig. 13 is an enlarged detached broken view of the outer member of the blank orienting device shown in Fig. 4.
Fig. 14 is a similar view of the inner member thereof.

A supply of these terminal blanks 20 is dumped into a hopper 26. In the floor of the hopper is a pair of vertically disposed, vertically reciprocable tumbling and orienting devices, 27 and 28 respectively, which are shown per se in Figs. 4, 12, 13 and 14, and in relation to the rest of the machine in Figs. 1, 2 and 3. They are reciprocated vertically in any suitable fashion, as by a weighted lever 29 and cam 30 driven continuously while the machine is operating in any suitable fashion. These devices 27 and 28 are shown in Figs. 1, 3 and 4 at substantially the upper limit of their reciprocation. At the lower limit, their upper ends will be down nearly flush with the floor of the hopper There being a supply of blanks 20 dumped into the hopper and lying helter-skelter around and over the devices 27 and 28 in their lower positions, these are set in motion. Since these two devices are identically alike in structure and operation, it will be sufficient to describe and follow only the device 27. This consists essentially of two members or parts, one an outer vertical hollow cylinder 31, having an open top and a closed bottom and formed with a suitably proportioned downward extension 32 to connect with the lever 29. The other part is a stem 33, located coaxially within the cylinder 31 to move rigidly therewith. A guide ring 34, which is also in effect a valve box, is suitably supported under the hopper and has a vertical bore in which the cylinder is slidably supported and guided. This cylinder has two ports 35 and 36 in its side wall near the bottom of its bore. Port 35, at the bottom, is a simple circular bore. Port 36, located a little above the port 35, is keyhole shaped, a circular bore with a communicating vertical narrower slot extending up therefrom. The stationary support or valve box 34 has a plain circular port 37 to be closed by the cylinder 31 except when aligned with either of the ports 35 and 36. The port 37 is connected to a suitable supply of compressed air (not shown) by a pipe 38.

The stem 33 is a cylinder of less diameter than the bore of the cylinder 31 over its entire length except at each end, where it is formed with flanges which fit and close the bore of the cylinder 31. These flanges preferably have a drive fit in the bore to hold the stem rigidly in place within the cylinder 31. The length over all of the stem is a little less than the length of the bore in which it is seated. The top ends of both the cylinder 31 and stem 33 are inwardly chamfered or countersunk to form a single conically inwardly sloping guide surface 39. There is an annular chamber 40 between the side walls of the cylinder 31 and of the body of the stem 33, closed at both ends by the flanges 41 and 42 of the stem at the top and bottom respectively. The top flange 41 is provided with as large a plurality of small, vertical bores or perforations 43 as possible, communicating from the chamber 40 to the outer air. There is also a small chamber 44 between the bottom of the flange 42 and the bottom wall of the bore of the cylinder 31. An axial bore 45 through the length of the stem 33 communicates from the chamber 44 to the open air above the surface 39. The port 35 opens radially outwardly from the chamber 44.

The top end of the bore 45 is so proportioned that it will admit the double flanged sleeve portion 24 of a blank but will not admit the wider forked terminal 22. As the device 27 rises through the tumbled unoriented blanks piled over it in the hopper, it may chance that a more or less vertically aligned blank will slip into the bore 45 and remain hanging vertically therein supported by its fork. Or it may chance that the device will pick up a blank and carry it up riding horizontally across the top of the device. In the latter case the blank will ordinarily lie flatwise. When the top of the keyhole port 36 registers with the port 37, a small amount of compressed air will enter the chamber 40 and blow, comparatively gently, up through the numerous bores 43, tending to lift the blank lying over them. Since the clamp or sleeve portion 24 of the blank is heavier than the fork portion 22 and also presents less effective surface to the air, the blank tends to turn into a vertical position and so to slip down into the bore 45, sleeve end first. As soon as it does this, the blank is removed from the effect of the air from the bores 43.

If this effect is not attained and the blank remains across the top of the cylinder 31, an abruptly more violent blast through the bores 43 will displace it, to fall back with the rest, when the circular larger bottom of the keyhole port registers with the port 37. It is to be noted that no pressure air is admitted to the bore 45 until after the port 36 is closed by rising completely above the port 37, thus cutting off the supply of air to the chamber 40.

A little later, the port 35 registers with the port 37 and a sudden blast of full pressure air goes up the bore 45, sufficiently powerful to blow a blank hanging in the top of the bore up out of the bore and into the downwardly opening end of a tubular magazine 46 directly over and in line with the bore 45.

The tubular magazine 46 curves over to the left, down, forward, and finally slantingly down to the right. The inertia of the blown up blank is sufficient to carry it around the top curve of the magazine and into the downward part where the weight of the blank carries it on down. To prevent jamming in the magazine in case blanks are thus supplied to it faster than they are removed below, a transverse slide 47 is positioned to be slidable across the bore of the magazine to close this a little above its entrance end. This slide is actuable in familiar fashion by a solenoid 48 and spring 49.

It is to be noted that the center of gravity of each blank is near the plane of the fork of the blank. Hence in sliding down the main portion of the tubular magazine under gravity, the blank will come to lie with the tooth-edged flanges of its sleeve uppermost.

For convenience in drawing and numbering, the device 27 has been described in detail, the device 28 being identically similar. For like reasons the right hand magazine 50, having a cut off slide 51, a solenoid 52 and a spring 53, and supplied by the device 28, will be described in further detail, the left magazine being in all respects, except orientation, the same.

A little below the top curve of the magazine 50 is a double gate valve generally indicated at 54. A primary purpose of this valve is to prevent air blasts from the bore 45 from passing into the downward part of the magazine to disturb blanks aligned therein. The two transversely sliding gates 55 and 56 are actuated by opposite ends of a centrally pivoted lever 57, actuated in turn by a link 58. The gates 55 and 56 are spaced apart along the magazine a distance to conveniently receive between them one blank. Normally the lower gate 56 is closed and the upper gate 55 is open. The valve 54 is so synchronized in action with the device 28, that the valve will operate only after the blast has been cut off through the bore 45 and while the device 28 is moving down. The gate 56 then permits the newly blown up blank, if any, to slide on down the magazine, while the gate 55 closes above the blank to bar out blasts of air from below.

Figure 9:
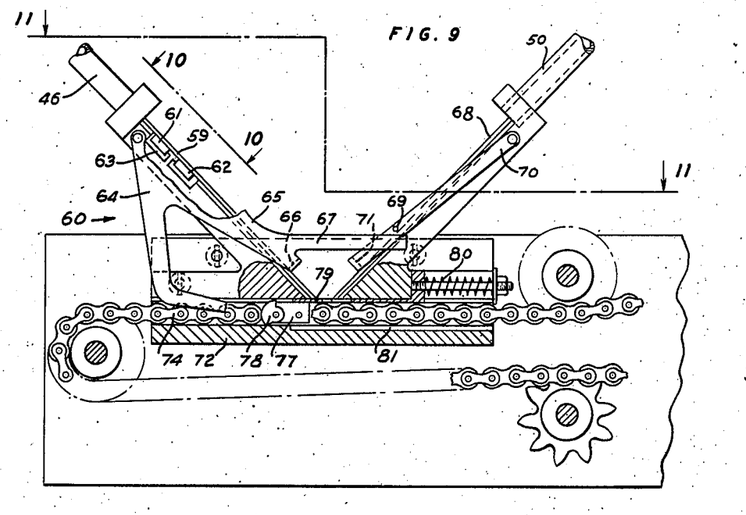
Fig. 9 is an enlarged longitudinal section to show the magazine delivery mechanism.
Figure 10:
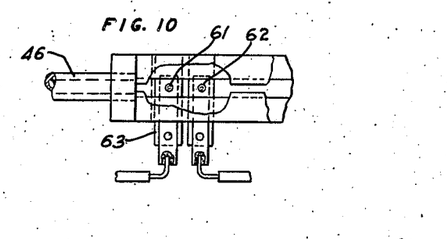
Fig. 10 is a view on the line 10—10 of Fig. 9.

Turning now to the left magazine again and to details shown in Figs. 9 and 10, the tubular magazine 46 delivers the properly oriented and aligned blanks in sequence to the downwardly slanting trough 59 of a blank delivery control device generally indicated at 60. In the bottom of this trough and near its upper end, a pair of electrical contact members 61 and 62, insulated from each other and from the trough by insulation 63, is mounted to be electrically connected together by the top blank of the longest sequence of blanks desired to be contained in the device 60 at any time. These contacts 61 and 62 are connected by means (not shown) to a power source (not shown) and to the solenoid 48 in such fashion that so long as the contacts are bridged by a blank the solenoid will actuate the slide 47 to prevent any more blanks from being delivered into the magazine 46. The contacts are here shown quite close to the delivery end of the magazine and delivery control. In other cases than the specific one described herein, it may be preferable to locate these contacts higher, e. g. in the tube 46 proper.

A lever 64 is pivoted at its upper end to the side of the upper part of the trough 59. One arm 65 extends down along the trough and carries a transversely disposed stop member 66, normally resting on the trough to prevent a blank therein from passing on down. The arm 65 further has an integral normally horizontally extending finger 67, whose outer end lies beside the trough 68 of the magazine 50 and engages under a pin 69 on a simple blank stop lever 70 pivoted on the trough 68 and having a transverse blank stop member 71. Thus when the lever 64 is raised to release a blank in the left hand trough 59, the finger 67 simultaneously raises the lever 70 to release a blank from the trough 68. The lever 64 has another arm extending downwardly and bent to the right by which the lever 64 may be cammed up.

For clarity of understanding it is well to remember that the tubes 46 and 50 curve forwardly from the hopper, as well as down and toward each other, so that the two troughs 59 and 68 are in one vertical plane, in front of and generally below the hopper. The two troughs oppose each other, so that the two blanks simultaneously delivered by the troughs are oriented oppositely, having their two fork ends approximated and their sleeve ends apart. This is a peculiarity of the specific problem here in question. In case of blanks of other form, or to be delivered all in like orientation, the tubes 68 and 50 might be curved to bring the troughs into substantially parallel alignment, or one magazine might be dispensed with.

Figure 11:
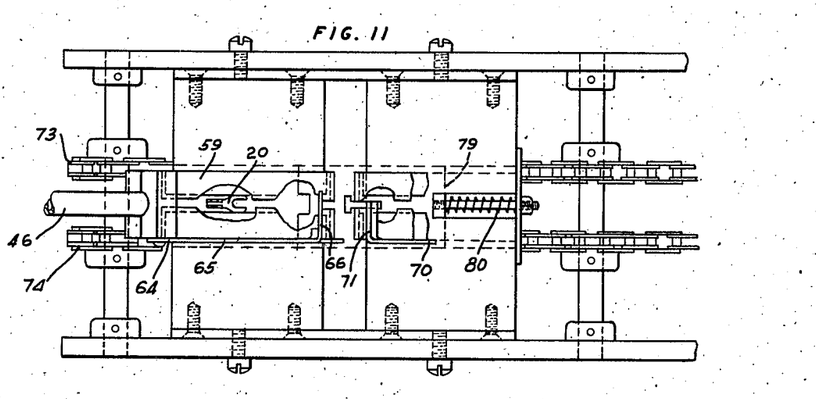
Fig. 11 is a view on the line 11—11 of Fig. 9.

Under the lower ends of the troughs 59 and 68, is a horizontal stationary table 72, over which slides (from left to right in Figs. 1, 9 and 11) a pair of sprocket chains, 73 and 74 respectively, running parallel to each other over various double idler sprockets 76 as shown and driven by the double sprocket 75. Work nests 77, best shown in Figs. 5, 6, 7 and 8, are mounted on and between the chains to be carried along thereby under the troughs 59 and 68. A reciprocable cover plate 79, yieldably held in the position shown in Fig. 9 by a compression spring 80, lies horizontally between the troughs 59 and 68 above and the chains 73 and 74 below. In the position of Fig. 9, the plate 79 closes the exits of the troughs until a nest 77 is brought along by the chains. Each nest has at its rear a pivotable pawl 78 held in the position shown in Fig. 9 by the contact of its lower end with the table 72 until its lower end falls into the slot 81 in the table when the pawl may rock counterclockwise. The upper end of the pawl is adapted to catch the left end of the slidable plate 79 and carry the plate along toward the right until the pawl is released. The spring 80 then returns the cover plate 79 to its normal position.

Figure 5:
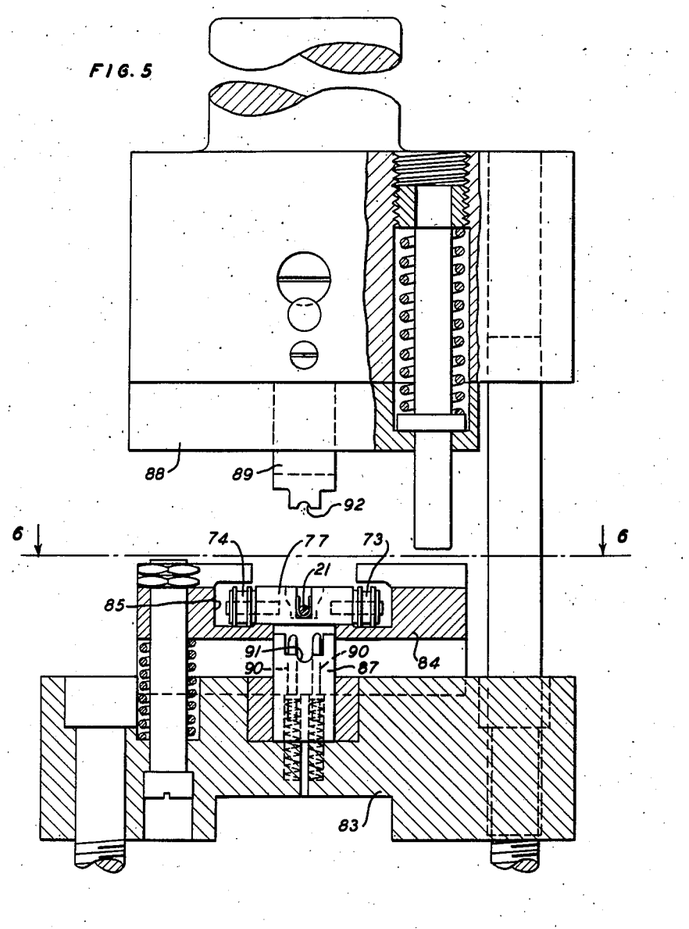
Fig. 5 is a partial, broken, vertical section through the assembling press on the line 5—5 of Fig. 6.
Figure 6:
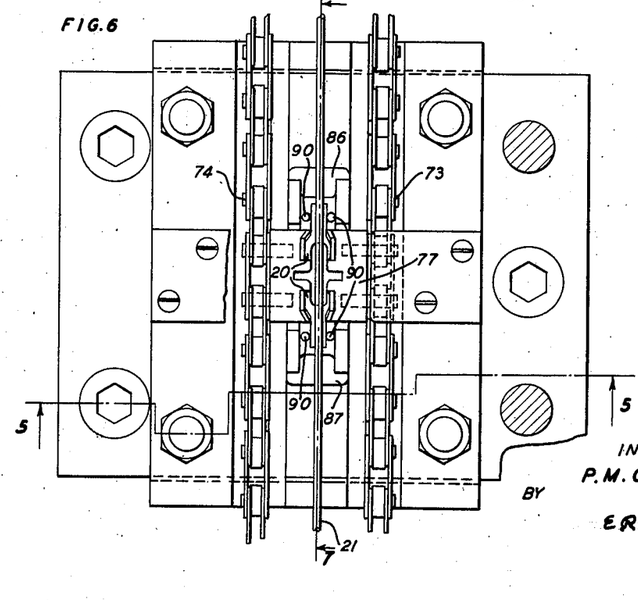
Fig. 6 is a partial view on the line 6—6 of Fig. 5.
Figure 7:
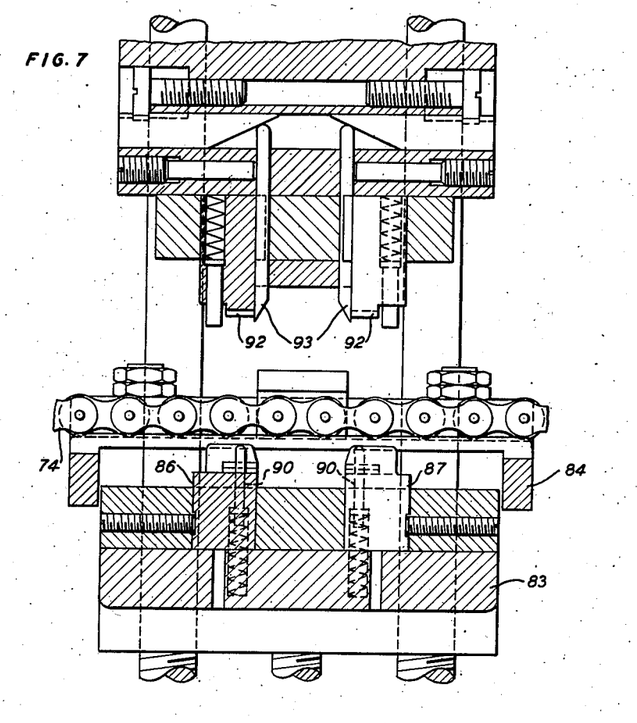
Fig. 7 is a view on the line 7—7 of Fig. 6.
Figure 8:
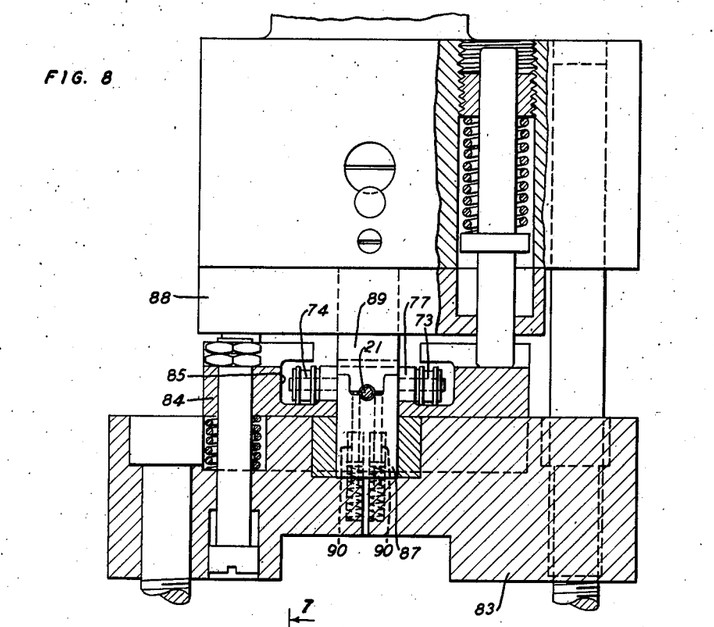
Fig. 8 is a view corresponding to Fig. 6 with the parts in another position.

The plate 79 is provided with two T-shaped slots so located and proportioned that when the nest registers under the outlets of the troughs the slots also register, and blanks, released at this moment by the lifting of the levers 64 and 70, will fall from the troughs, through the slots, and come to rest in the nest in the positions in the nest shown in Figs. 6 and 5. The blanks are snugged down into the gentle frictional grip of the nests by passing under the cover plate 79.

Turning again to Figs. 1 and 5 to 8, the chains carry the nest along to the right horizontally, then slightly upward over one of the double idler sprockets, and thence horizontally across the bed plate of a punch press. As the nest travels up the incline, it is met by the strand or cord 21 upon which the terminal blanks are to be clamped. The cord 21 is drawn from a suitable supply reel 114, over a guide sheave 115, and under a guide sheave 116 to lie longitudinally along the two blanks in the nest down in the U-shaped sleeve portion of each of the blanks as shown in Fig. 5. The showing of the cord 21 is omitted from Fig. 6 to avoid confusion.

A spring supported table 84 is mounted on the bed 83 of the press and formed with an undercut slot 85 to pass and support the chains and nests as they advance over the bed plate, and to keep these, while moving, above and clear of two symmetrically identical blocks 86 and 87 rigidly mounted on the press bed. The blocks 86 and 87 are so spaced apart, longitudinally of the sprocket chains, as to receive the nest between them when the latter is forced down together with the table, and thus position the nest accurately under the ram 88 of the press to register with the punch 89. Spring pressed guide fingers 90 in the blocks 86 and 87 receive the necks of the blanks in the nest between them and position these accurately in forming surfaces 91 on the blocks. Corresponding forming surfaces 92 are provided on the punch 89 to convert the necks of the blanks from the form shown in Fig. 18 to that of Fig. 19. The punch is further provided with downwardly projecting knives 93 to cut away the cord between the necks of the two formed terminals in a nest as indicated at 94 in Fig. 19.

Figure 15:
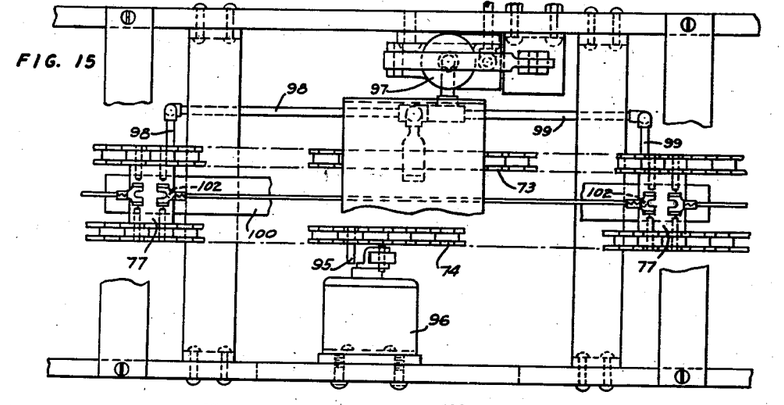
Fig. 15 is a broken plan view, somewhat enlarged, of a mechanism for removing the finished product from the apparatus, omitted from Fig. 2.
Figure 16:
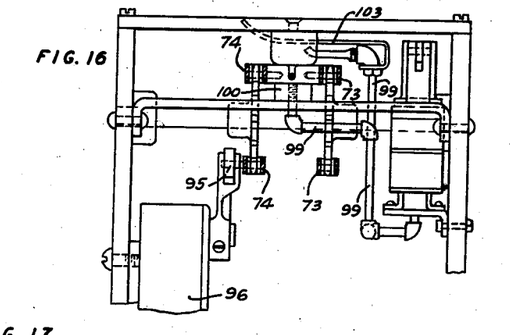
Fig. 16 is an end elevation thereof.
Figure 17:
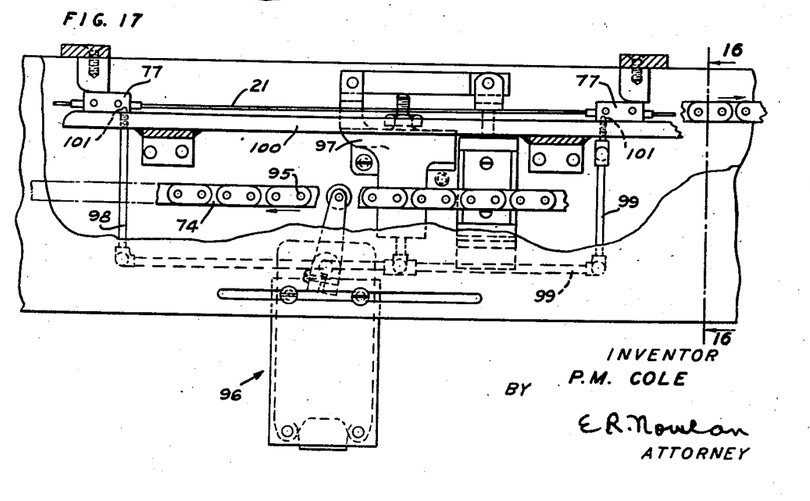
Fig. 17 is a front elevation thereof.

On leaving the forming and cutting press of Figs. 5 to 8, the chains and nests pass through the devices shown in Figs. 15, 16 and 17, where the formed and severed cords are removed. Each completed cord leaving the forming press consists of a piece of strand severed from the supply and having a terminal clamped on each end. One of these terminals is held in the rear part of one nest. The other is held in the front part of the next following nest. The cord or strand between these two terminals is under a slight longitudinal tension due to the drag of the strand being drawn from the supply. The two nests shown in Fig. 15 arrive at the position shown there as the chains stop for the press to act on the terminals in the next nest. Just before arriving at the position shown, a pin 95 on the return side of the chain 74 has actuated an electrical switch generally indicated at 96, which in turn by means not shown has opened a valve 97 to supply compressed air to pipes 98 and 99. The nests slide over and rest on a flat track 100. The pipe 99 communicates with a round ended nozzle 101 extending slightly above the surface of the track to register in the bottom of a corresponding perforation 102 under the neck of the terminal in the front portion of the left hand nest 77 (Fig. 15). Thus this terminal is blown up out of the nest. At the same moment the terminal in the rear portion of the front seat is similarly blown up and out of the nest. The terminals move up until they each strike a horizontal deflector 103 directly over each nest. Here they encounter a horizontal transverse air blast from a nozzle 104 fed from the same air supply and are blown out sidewise with their cord to fall clear of the apparatus into any suitable receptacle not shown.

The apparatus generally is driven from a main shaft 106 (Fig. 2) which in turn is driven from some power source not shown. The moving parts of the unit for orienting and delivering blanks to the nests, including particularly the lever 29 and the link 58 are continuously operated from the shaft 106 through the shaft 107. The shaft 108, which drives the nest chains, is driven from the shaft 106 through a clutch device generally indicated at 109. This clutch is actuated by a bell crank lever 110 actuated by a link 111 connected to another lever 112 connected to a solenoid 113 actuable by the switch 105. The lever 112 is also connected to the conventional trip mechanism of the press. Thus the nest chains are stopped by the actuation of the clutch 109 while the press is tripped to drive its punch down on a nest.

The present invention relates particularly to the arrangement for receiving, orienting and magazining the blanks. The general organization of which this is one component is no part of the invention, being described and claimed in copending application Serial No. 373,464, filed of even date herewith by the same inventor.

The specific embodiment herein disclosed to illustrate the invention is, as pointed out above, conditioned as to detail by the form and purpose of the specific problem for which it is designed, and may be modified and departed from in various ways without departing from the spirit and scope of the invention as pointed out in and limited only by the appended claims.

What is claimed is:

1. Apparatus for orienting and magazining unoriented articles and comprising a container to receive a supply of unoriented articles, a reciprocable member within the container to pick up an article on the one end thereof during a forward motion thereof, means to align a principal axis of the article with the axis of the member, means to dislodge an unaligned article from the member, a magazine, and means to throw an aligned article from the member into the magazine without change of orientation of the article.

2. Apparatus for orienting and magazining unoriented articles and comprising a container to receive a supply of unoriented articles, a vertically reciprocable tubular member within the container to pick up an article on the one end thereof during a forward motion thereof, means to deliver a fluid from the top of the member near the periphery thereof to align a principal axis of an article thereon with the axis of the tube to permit the article to enter into the tubular member and to dislodge an unalignable article from the top of the member, a tubular magazine in alignment with and over the member, and means to deliver a fluid through the axis of the tubular member to eject an article therefrom into the magazine without change of orientation of the article.

3. In an apparatus for orienting and magazining unoriented articles and having a container to receive a supply of unoriented blanks, vertically reciprocable means within the container to pick up an article on the one end thereof during a forward motion thereof, the said means comprising a cylindrically tubular housing and coaxially therein and reciprocable therewith a smaller tube defining an annular chamber between the housing and the tube and having a flange at the top thereof across the chamber and formed with a plurality of pores communicating from the chamber at the top thereof to the outer air, in combination with valve means to deliver compressed air to the annular chamber to blow out through the pores thereof to align a principal axis of an article on the flange with the vertical axis of the tube to enter into the tube or to dislodge an unalignable article, and valve means to deliver compressed air to the bore of the tube to eject an oriented article therefrom.

4. In an apparatus for orienting and magazining unoriented articles and having a container to receive a supply of unoriented blanks, vertically reciprocable means within the container to pick up an article on the one end thereof during a forward motion thereof, the said means comprising a cylindrically tubular housing and coaxially therein and reciprocable therewith a smaller tube defining an annular chamber between the housing and the tube and having a flange at the top thereof across the chamber and formed with a plurality of pores communicating from the chamber at the top thereof to the outer air, in combination with valve means to deliver compressed air to the annular chamber to blow out through the pores thereof to align a principal axis of an article on the flange with the vertical axis of the tube to enter into the tube or to dislodge an unalignable article, valve means to deliver compressed air to the bore of the tube to eject an oriented article therefrom, and a magazine having a vertical tubular entrance over the said tube to receive oriented articles ejected therefrom.

PAUL M. COLE.